(12) United States Patent
Kanomata et al.

(10) Patent No.: US 6,657,845 B2
(45) Date of Patent: Dec. 2, 2003

(54) CIRCUIT FOR DRIVING A SOLENOID

(75) Inventors: Kazuo Kanomata, Sakado (JP);
Teruya Sawada, Sakado (JP); Takashi Nakamura, Sakado (JP)

(73) Assignee: Nippon Control Industrial Co., Ltd., Saitama (JP)

( * ) Notice: Subject to any disclaimer, the term of this patent is extended or adjusted under 35 U.S.C. 154(b) by 402 days.

(21) Appl. No.: 09/816,154

(22) Filed: Mar. 26, 2001

(65) Prior Publication Data

US 2002/0041478 A1 Apr. 11, 2002

(30) Foreign Application Priority Data

Oct. 11, 2000 (JP) ..................... 2000-310620
Dec. 5, 2000 (JP) ..................... 2000-369874
Jan. 17, 2001 (JP) ..................... 2001-008891

(51) Int. Cl.[7] .............................. H01H 47/00
(52) U.S. Cl. ..................... 361/159; 361/156
(58) Field of Search ................... 361/139, 143, 361/146, 152, 153, 154, 155, 156, 159

(56) References Cited

U.S. PATENT DOCUMENTS

| | | | | |
|---|---|---|---|---|
| 4,246,621 A | * | 1/1981 | Tsukioka | 361/56 |
| 4,318,155 A | * | 3/1982 | Thomas | 361/156 |
| 5,036,422 A | * | 7/1991 | Uchida et al. | 361/159 |

* cited by examiner

*Primary Examiner*—Ronald W. Leja
(74) *Attorney, Agent, or Firm*—Wenderoth, Lind & Ponack, L.L.P.

(57) ABSTRACT

A series circuit including a diode for refluxing and a capacitor is connected in parallel to a solenoid coil, and a light-emitting diode is connected in parallel to the capacitor. A negative voltage appearing across the solenoid coil because of an induced electromotive force generated in the solenoid coil can be attenuated and a fall time of current flowing into the solenoid coil can be shortened.

40 Claims, 6 Drawing Sheets

INPUT VOLTAGE

A PART OF A CIRCUIT FOR DISCHARGE

INPUT VOLTAGE

CIRCUIT FOR DRIVING A SOLENOID

BACKGROUND OF THE INVENTION

1. Technical Field

This invention relates to a circuit for driving a solenoid which can shorten a process of induced electromotive force generated in a solenoid coil and shorten a fall time of an inflow current to the solenoid coil when the solenoid coil, as part of a motor, an electromagnetic pump, or other device is driven by supplying DC pulses.

2. Description of the Related Art

A fundamental circuit for a DC pulse driver that drives a motor, an electromagnetic pump and so on by using electromagnetic power generated by supplying electricity to the solenoid coil is shown in FIG. 4. This circuit is such that a solenoid coil P of an electromagnetic pump is connected to a collector side of a transistor Tr1 for switching. A diode D1 for refluxing is connected in parallel to the solenoid coil P and in a reverse direction, so that the transistor Tr1 turns on. Consequently, an electric current Ip flows into the solenoid coil P when an input voltage is supplied to a base of the transistor Tr1, as seen in FIG. 5 (a). At the same time, a collector voltage Vc of the transistor Tr1 is decreased from Vcc to about zero, the current Ip flowing into the solenoid coil P is increased transiently as seen in FIG. 5 (c), and electromagnetic energy is stored in the solenoid coil P by the current Ip. When the input voltage to the base of the transistor Tr1 becomes zero, according to a self-induced electromotive force (c.f. with the equations below):

$$e = L(\Delta Ip/\Delta t) \quad e = L(dIp/dt)$$

by the electromagnetic power that makes the current flow in a direction such that change of magnetic flux is prevented, so that the electric potential of Vc is increased. Namely, the result is that a large reverse voltage is generated across the solenoid coil P. The large voltage generated across the solenoid coil P is eliminated by electric current flowing into the diode D1 that is connected in parallel to the solenoid coil P.

Accordingly, as shown by FIG. 5 (c), in the prior circuit, when the transistor Tr1 turns on, the current flowing into the solenoid coil P rises and increases according to a specific time constant. Furthermore, when the transistor Tr1 turns off, the current flowing into the solenoid coil P with its inductance becomes zero. Consequently, the magnetic flux of the solenoid coil P is decreased, so that the induced electromotive force is generated while a current Id flows into the diode D1 for refluxing. The current Id becomes zero after a specific time tf according to a relatively long time constant because of a decrease in the amount of the induced electromotive force.

A fall time of the current Ip flowing into the solenoid coil P is most rapid when nothing is connected to the ends of the solenoid coil P. However, when nothing is connected to the ends of the solenoid coil P, a voltage from several times to several tens of times of a rated voltage of a transistor (FET's, JFET's, MOSFET's, etc.) used as a switching element is generated. Since such voltages can destroy the switching element, it is necessary to connect the diode D1 for refluxing as shown in FIG. 4 to protect the switching element.

However, in such a method, when a driving frequency of an input voltage increases or an off-time in a supplying pulse is reduced, the time it takes the current Ip to go to zero, tf, becomes short. This shortening of the time tf results in an undesirable condition since the input voltage rises and the current starts to increase before the current completely reaches zero, thereby decreasing an effective amplitude of the pulse as seen FIG. 5 (c). As a result, in the case of the electromagnetic pump, a plunger starts the next movement before the plunger completely returns to its initial position, so that an effective stroke of the plunger is decreased (decreasing an effective amplitude). Therefore, one method to alleviate this problem is to connect a resistor in series with the diode D1 for refluxing. Alternatively, a Zener diode (not shown in the attached figures) could be used to decrease the fall time of the current. But, in this case, heat generated by the resistor or the Zener diode in the circuit becomes a problematic.

Accordingly, as shown in FIG. 6, it is proposed that a capacitor C1 should be connected in series to an anode of the diode D1 for refluxing along with a discharge circuit for the capacitor C1 that includes a series connected diode D2 and transistor Tr2 connected in parallel to a series connected refluxing diode D1 and capacitor C1. However, in this circuit, it is desirable that an electrical charge stored in the capacitor should be discharged rapidly. Therefore, it becomes necessary to construct a more complicated circuit in consideration of a discharge timing by the transistor Tr2 along with other associated effects.

SUMMARY OF THE INVENTION

Accordingly, the present invention is to provide a circuit for driving a solenoid which can decrease a negative voltage generated across a solenoid coil and can shorten a fall time of a current flowing into the solenoid coil with a simple construction.

The present invention is a circuit for driving a solenoid coil comprising a switching element connected in series to a solenoid coil and turned on or off by an input voltage with a specific pulse width to intermittently generate magnetism in the solenoid coil. A series circuit is connected in parallel to the solenoid coil. The series circuit includes a diode and a capacitor connected in series. The diode has a cathode connected to a power source line and the capacitor is connected in series to an anode of the diode. A light-emitting diode is connected in parallel to the capacitor.

Therefore, when a condition of the switching element changes from on to off, a large negative voltage is generated across the solenoid coil by an induced electromotive force generated on the solenoid coil. But the diode is arranged in a forward direction with respect to the negative voltage, so that electric current flows into the capacitor and the light-emitting diode and the capacitor is charged. When a potential difference across the solenoid coil becomes zero, an electrical charge in the capacitor flows into the light-emitting diode until a potential difference across the capacitor becomes zero, so that the negative voltage across the solenoid coil can be quickly removed. Furthermore, because the current is refluxed rapidly, the fall time of the current flowing into solenoid coil is less compared with existing systems. Furthermore, by using the light-emitting diode in the circuit, the current flowing into the light-emitting diode is changed not to the heat but rather to the light. The resulting effect is to prevent the generation of heat in both the circuit and in the solenoid coil itself.

Moreover, a plurality of light-emitting diodes may be connected in parallel to the light-emitting diode. Therefore, inexpensive light-emitting diodes with low currents ratings (i.e. the amount of current allowed to flow from an anode to a cathode thereof) can be used advantageously to reduce cost and improve performance.

Furthermore, a protective diode may be reverse connected (according to polarity) and in parallel to each light-emitting diode. Therefore, when a voltage over a specific value is applied to the light-emitting diode, a current flows into the diode for protection to protect the light-emitting diode. As a result, an inexpensive light-emitting diode with a low current rating can be used for this purpose.

Moreover, it is desirable that a resistor with a specific value is connected in series to the capacitor and another resistor with a specific value is connected in series to the light-emitting diode. Therefore, it is possible to manipulate a charging time and a discharging time of the capacitor, and a voltage applied to each diode used for refluxing or a voltage applied to each light-emitting diode.

Furthermore, it is desirable that the light-emitting diode can be operated in any portion of an electromagnetic spectrum (e.g. visible, infrared, etc.).

DETAILED DESCRIPTION OF THE PREFERRED EMBODIMENTS

Hereinafter, we explain the preferred embodiments of the present invention with reference to the accompanying drawings.

Figure 1:
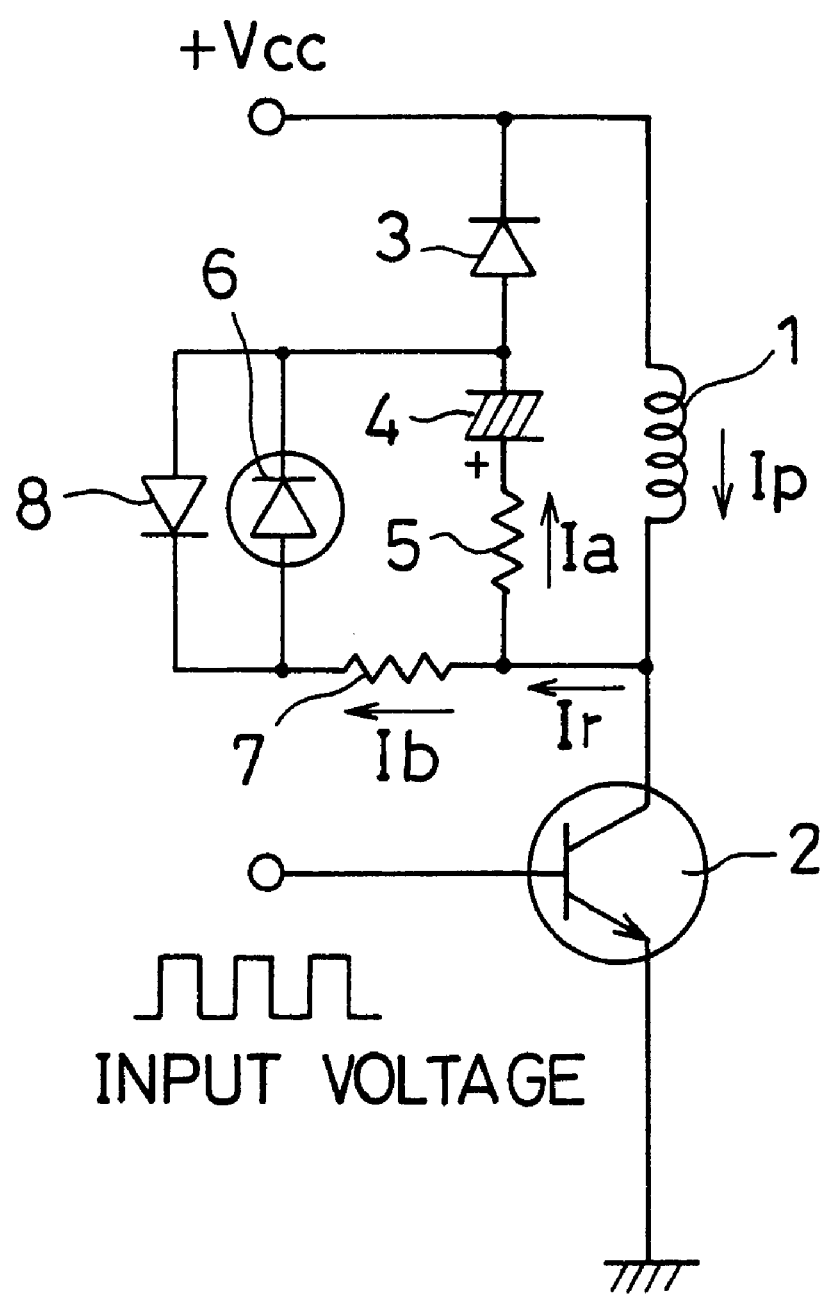
FIG. 1 is a circuit diagram of a circuit for driving a solenoid showing one embodiment of the present invention.

In FIG. 1, a circuit for driving a solenoid according to the present invention is shown. In the circuit for driving a solenoid, a solenoid coil 1 is used in a motor, an electromagnetic pump, other related device. Explaining it in an example adapted for use in driving an electromagnetic pump, the solenoid coil 1 is connected to a collector of a switching element 2 such as a transistor. An input voltage with a specific duration (a pulse width) is input to a base of the transistor 2 to conduct between the collector side and an emitter, and then an electric current Ip can intermittently flow into the solenoid coil 1 correspondingly to the input voltage.

A series circuit comprising a diode 3, a capacitor 4 and a resistor 5 is connected in parallel to the solenoid coil 1. The diode 3 is for refluxing and has its cathode connected to a power source line. The capacitor 4 is connected to an anode of the diode 3, and the resistor 5 is connected to the capacitor 4. A series circuit, comprising a light-emitting diode (LED) 6 and a resistor 7, is connected in parallel to the series connected capacitor 4 and resistor 5. The LED 6 has its cathode connected to the anode of the diode 3. Furthermore, a diode 8 is connected in parallel but in a reverse direction with respect to a polarity of the LED 6. Note that the diode 8 functioning as a protective diode for LED 6 is approximately 3 to 6 VDC. Specifically, in this embodiment, a direct current resistance of the solenoid coil 1 is 7.5 Ω, a source voltage (Vcc) is 12 VDC, the capacitor 4 is 10 μF, the resistor 5 is 10 Ω, the resistor 7 is 51 Ω, and a rated current of the LED 6 is 20 mA.

Figure 2:
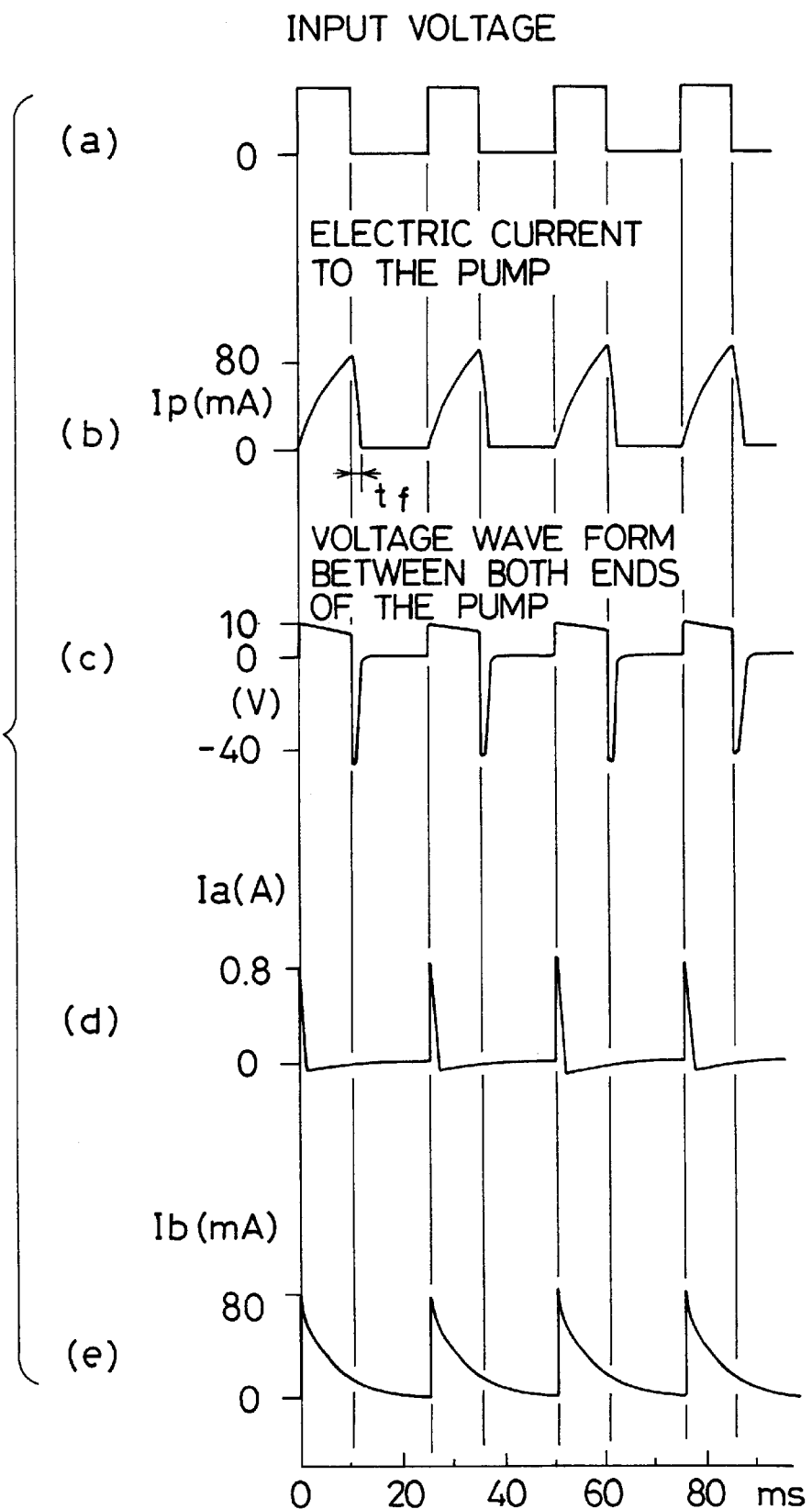
FIG. 2 is a waveform diagram illustrating typical waveform characteristics in some portions of the driving circuit.

In the above construction, an input voltage (FIG. 2 (a)) with a specific pulse width is input to the base of the transistor 2, which serves as a switching element. The input voltage causes conductivity between the collector and the emitter of the transistor 2 switching the transistor 2 into an on-condition and causing an electric current Ip to flow into the solenoid coil 1. At the same time, the current Ip increases gradually as shown in FIG. 2 (b) because an induced electromotive force works in a direction such that magnetic flux is prevented from increasing with increase of the current.

When the input voltage applied to the base becomes zero, the transistor 2 switches to an off-condition making the voltage applied across the solenoid coil 1 momentarily zero so that the current decreases suddenly. As a result, an induced electromotive force (c.f. with the equations below):

$$e=-L(\Delta Ip/\Delta t) \quad e=-L(dIp/dt)$$

is generated in a direction such that a decrease of the magnetic flux is prevented. A collector voltage of the transistor 2 becomes higher than the source voltage Vcc by the induced electromotive force, so that a large negative voltage as shown in FIG. 2 (c) is generated. Then, the diode 3 is in a direction of easy flow against the negative voltage, so that an electric current Ir flows and refluxes from the diode 3 via the power source line to the solenoid coil 1 to attenuate the negative voltage. Furthermore, the current Ir is divided into a current Ia (FIG. 2 (d)) charging the capacitor 4 via the resistor 5 and a current Ib (FIG. 2 (e)) which flows to the LED 6 via the resistor 7 causing the LED 6 to emit light. Then, during the time that the capacitor 4 is charging, the negative voltage is decreased by the current Ir, but the current Ia charges the capacitor 4, so that the only current Ib flowing into the LED 6 refluxes to the solenoid coil 1 via the diode 3. As a result, the current refluxed into the solenoid coil 1 can be small. Then, after charging of the capacitor with decrease of the negative voltage, the electrical charge stored in the capacitor 4 is discharged into the LED 6 via the resistors 5 and 7 until an electrical potential of the capacitor 4 becomes zero and does not reflux to the diode 3 and the solenoid coil 1, so that the fall time tf of the current flowing into the solenoid coil 1 can be shortened as shown in FIG. 2 (b). Furthermore, because the current refluxed into the solenoid coil 1 can be reduced, the generation of heat in the solenoid coil 1 can be limited.

Figure 5:
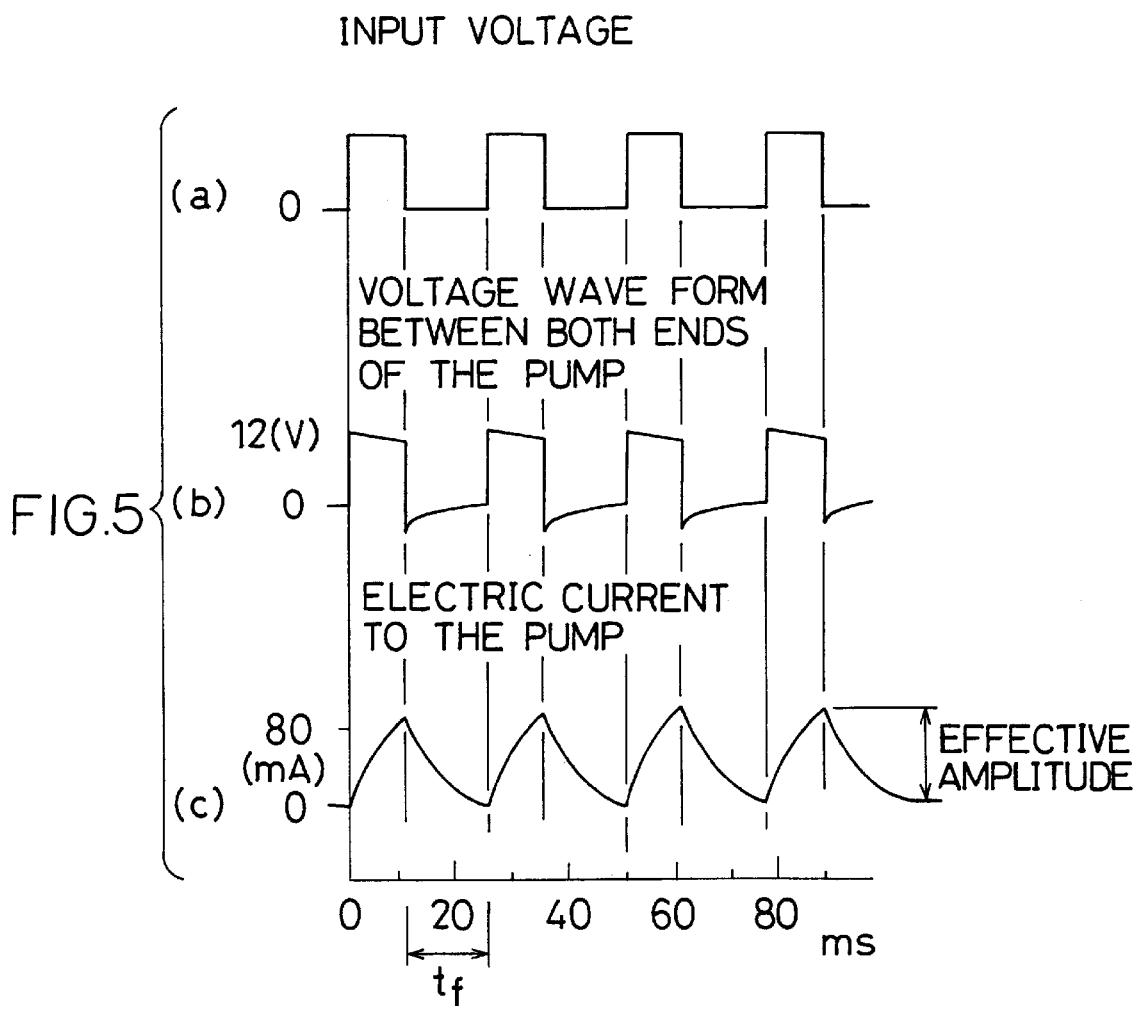
FIG. 5 is a waveform diagram illustrating typical waveform characteristics in some portions of the prior driving circuit.
Figure 6:
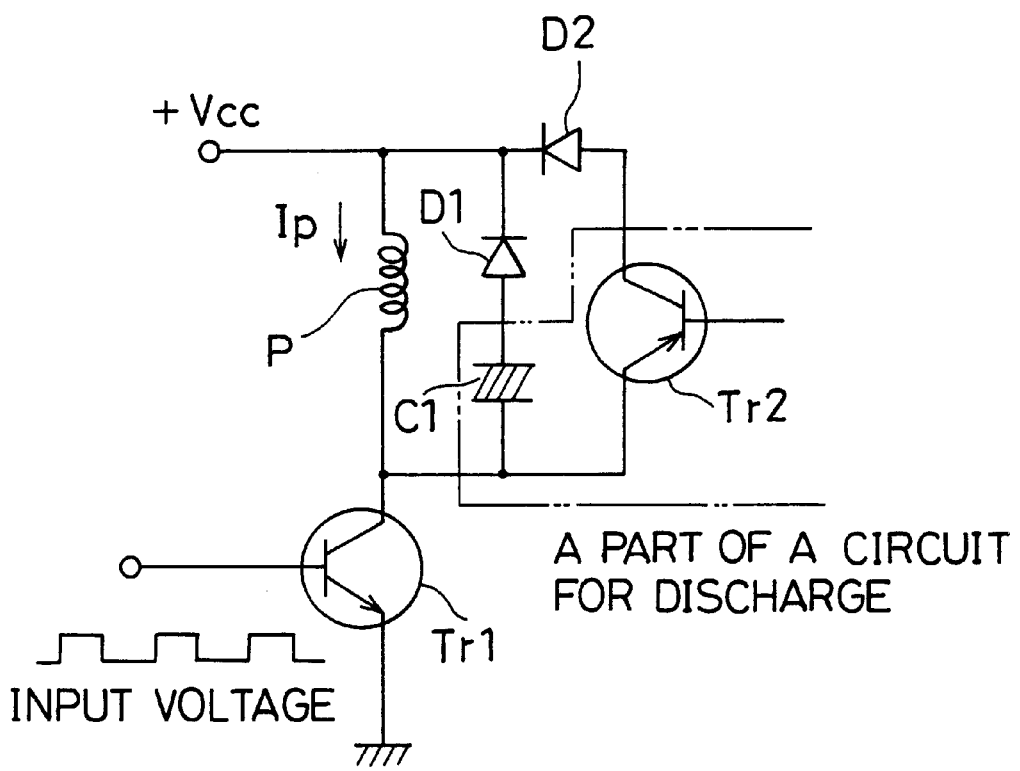
FIG. 6 is a circuit diagram of another prior circuit for driving a solenoid.

As shown in FIG. 5 (c) as prior art, provided that a period is 25 ms and a pulse width is 10 ms, the fall time tf of the input voltage is 15 ms. A fall time condition of the current flowing into the solenoid coil already limits an effective amplitude of the current. Namely, if a pulse frequency of the input voltage increases more than the present condition or the pulse width thereof is increased more than the present condition, the result will be that the next input voltage rises before the current reaches zero. Accordingly, in this electromagnetic pump example, a plunger is operated before it returns to its initial position, which is inconvenient since this specific pulse amplitude cannot be maintained.

However, explaining the present invention by example, the fall time tf of a current flowing into the electromagnetic pump can be adjusted to as low as 2 ms under the same set of conditions. Thus, it is possible that the pulse frequency in the input voltage can be increased or the pulse width (duration of supply time) can be increased. For example, given the same pulse width, the pulse frequency can be increased to about 80 Hz which is over twice what was previously possible. Therefore, a high-performance electromagnetic pump that can be operated at higher frequency can be manufactured.

Figure 3:
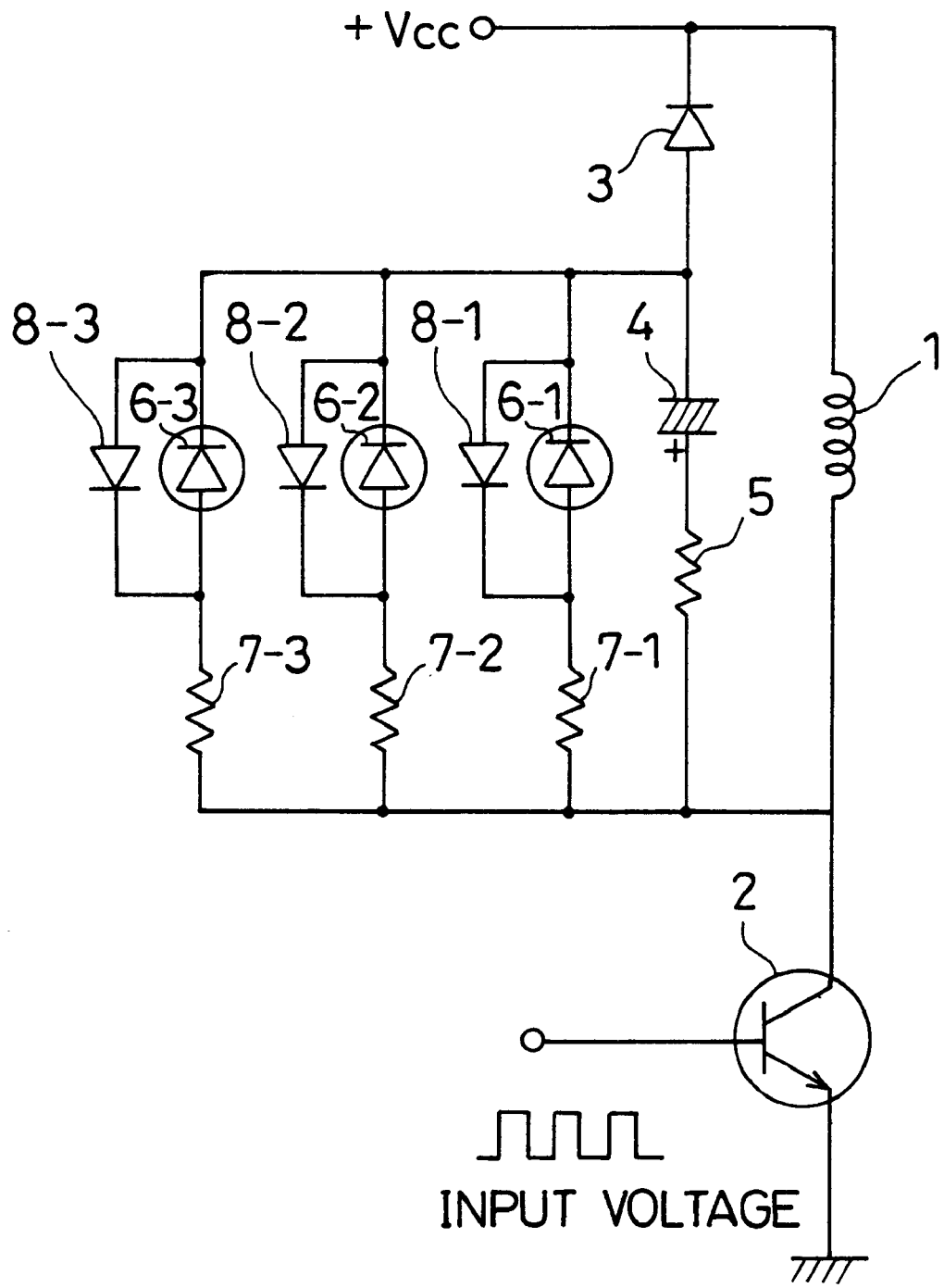
FIG. 3 is a circuit diagram of a circuit for driving a solenoid showing another embodiment of the present invention.
Figure 4:
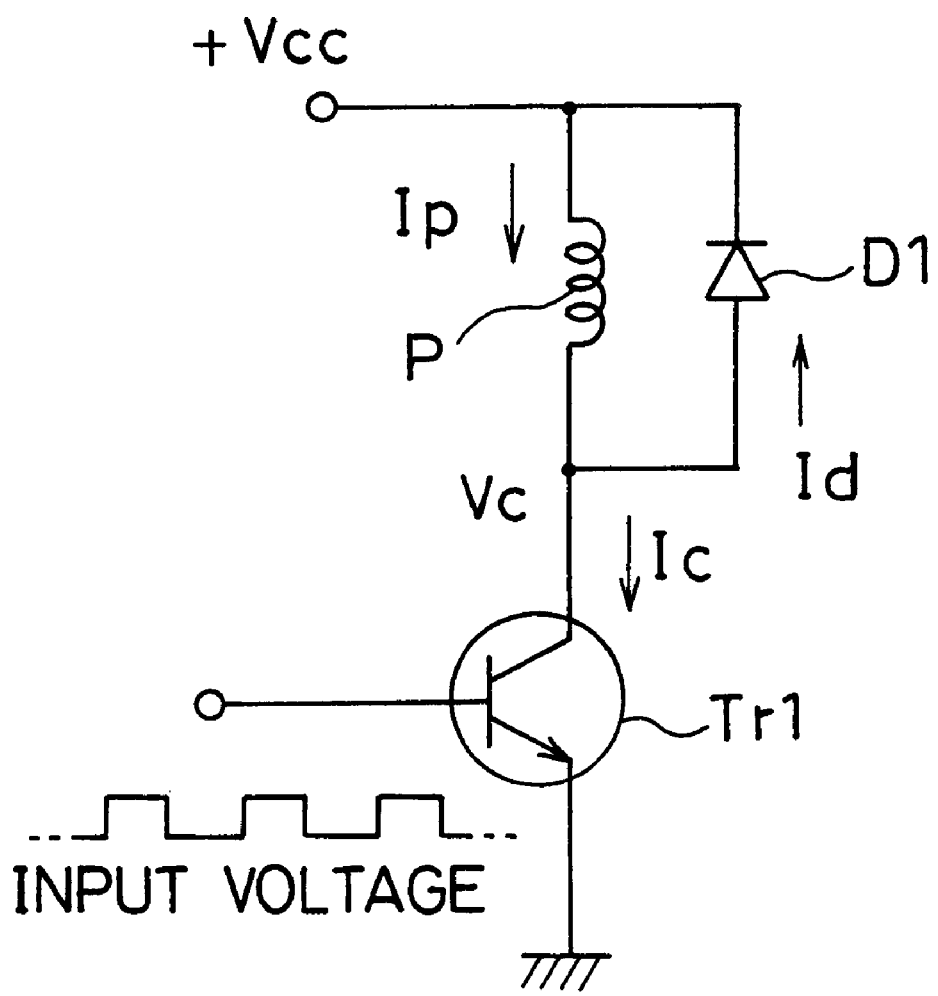
FIG. 4 is a circuit diagram of one prior circuit for driving a solenoid.

In FIG. 3, the other embodiment of the present invention is shown. In this embodiment, if the power source voltage Vcc becomes high, the induced electromotive force necessarily becomes large and the refluxing current is increased, so that, to the series connected capacitor 4 and diode 3 for refluxing, light-emitting diodes 6-1, 6-2, 6-3 are connected in parallel so as to correspond to the large refluxing current induced by the large induced electromotive force. Note that protective diodes 8-1, 8-2, 8-3 and resistors 7-1, 7-2, 7-3 are provided on the light-emitting diodes 6-1, 6-2, 6-3, respectively, similar to the embodiment above.

Furthermore, by using a plurality of light-emitting diodes 6-1, 6-2, 6-3, we can use inexpensive light-emitting diodes each of which has a small rated current, so that this embodiment has a price performance advantage in reducing cost in comparison with using just one light-emitting diode with a large rated current. Namely, a diode (about ¥100) with a large rated current (e.g. 50 mA) is about ten times the price of a diode (¥10 to ¥15) with a small rated current (e.g. 10 mA to 30 mA).

Moreover, for example, LED 6 could operate in the visible, infrared, or any other portion of the electromagnetic spectrum. In each case, the same effects and functions are achieved. For example, in the event an infrared light LED is used, if a circuit for receiving infrared light is added, it can be used in the same manner as in the event a visible light type LED is used, and so on. Furthermore, continuing this example, if a circuit for receiving visible light, infrared light or any other portion of the electromagnetic spectrum is added, we can have a clear grasp of a state of refluxing by the induced electromotive force. This state information could then be used as a means of operational control of the electromagnetic pump, and so on.

As mentioned above, according to the present invention, an LED is connected in parallel to a series connected capacitor and diode for refluxing an electric current which flows due to an induced electromotive force generated in a solenoid coil. As a result, a large negative voltage generated by the induced electromotive force can be attenuated and fall of an electric current flowing into the solenoid coil can be shortened. Thus, a high-performance electromagnetic pump can be manufactured, having the ability to safely operate even at high frequency.

What is claimed is:

1. A driving circuit for use with a power source and a solenoid having a solenoid coil, said driving circuit comprising:
    a switching element to be connected in series to the solenoid coil, and operable to turn on and off in accordance with an input voltage with a specific pulse width so as to intermittently generate magnetism in the solenoid coil;
    a series circuit to be connected in parallel to the solenoid coil, said series circuit comprising a diode and a capacitor connected in series, said diode having a cathode to be connected to the power source, and said diode having an anode connected to said capacitor; and
    a first light-emitting diode connected in parallel to said capacitor.

2. A driving circuit according to claim 1, further comprising at least one further light-emitting diode connected to said light-emitting diode.

3. A driving circuit according to claim 2, further comprising a protective diode connected in a reverse direction and in parallel to said first light-emitting diode.

4. A driving circuit according to claim 3, further comprising a resistor with a specific resistance value, connected in series to said capacitor.

5. A driving circuit according to claim 4, further comprising a plurality of resistors, each with a specific resistance value, connected in series to said first light-emitting diode and said at least one further light-emitting diode, respectively.

6. A driving circuit according to claim 5, wherein said first light-emitting diode and said at least one further light-emitting diode are visible type light-emitting diodes.

7. A driving circuit according to claim 5, wherein said first light-emitting diode and said at least one further light-emitting diode are infrared type light-emitting diodes.

8. A driving circuit according to claim 3, further comprising a plurality of resistors, each with a specific resistance value, connected in series to said first light-emitting diode and said at least one further light-emitting diode, respectively.

9. A driving circuit according to claim 2, further comprising a resistor with a specific resistance value, connected in series to said capacitor.

10. A driving circuit according to claim 9, further comprising a plurality of resistors, each with a specific resistance value, connected in series to said first-emitting diode and said at least one further light-emitting diode, respectively.

11. A driving circuit according to claim 2, further comprising a plurality of resistors, each with a specific resistance value, connected in series to said first-emitting diode and said at least one further light-emitting diode, respectively.

12. A driving circuit according to claim 1, further comprising a protective diode connected in a reverse direction and in parallel to said first light-emitting diode.

13. A driving circuit according to claim 12, further comprising a resistor with a specific resistance value, connected in series to said capacitor.

14. A driving circuit according to claim 13, further comprising a resistor with a specific resistance value, connected in series to said fist light-emitting diode.

15. A driving circuit according to claim 12, further comprising a resistor with a specific resistance value, connected in series to said first light-emitting diode.

16. A driving circuit according to claim 1, further comprising a resistor with a specific resistance value, connected in series to said capacitor.

17. A driving circuit according to claim 16, further comprising a resistor with a specific resistance value, connected in series to said first light-emitting diode.

18. A driving circuit according to claim 1, further comprising a resistor with a specific resistance value, connected in series to said first light-emitting diode.

19. A driving circuit according to claim 1, wherein said first light-emitting diode is a visible light type light-emitting diode.

20. A driving circuit according to claim 1, wherein said first light-emitting diode is an infrared type light-emitting diode.

21. A driving circuit for use with a power source, said driving circuit comprising:
    a solenoid having a solenoid coil;
    a switching element connected in series to said solenoid coil, and operable to turn on and off in accordance with an input voltage with a specific pulse width so as to intermittently generate magnetism in said solenoid coil;

a series circuit connected in parallel to said solenoid coil, said series circuit comprising a diode and a capacitor connected in series, said diode having a cathode to be connected to the power source, and said diode having an anode connected to said capacitor; and a first light-emitting diode connected in parallel to said capacitor.

22. A driving circuit according to claim 21, further comprising at least one further light-emitting diode connected to said first light-emitting diode.

23. A driving circuit according to claim 22, further comprising protection diodes connected in a reverse direction and in parallel to said first light-emitting diode and said at least one further light-emitting diode, respectively.

24. A driving circuit according to claim 23, further comprising a resistor with a specific resistance value, connected in series to said capacitor.

25. A driving circuit according to claim 24, further comprising a plurality of resistors, each with a specific resistance value, connected in series to said first light-emitting diode and said at least one further light-emitting diode, respectively.

26. A driving circuit according to claim 25, wherein said first light-emitting diode and said at least one further light-emitting diode are visible light type light-emitting diodes.

27. A driving circuit according to claim 25, wherein said first light-emitting diode and said at least one further light-emitting diode are infrared type light-emitting diodes.

28. A driving circuit according to claim 23, further comprising a plurality of resistors, each with a specific resistance value, connected in series to said first light-emitting diode and said at least one further light-emitting diode, respectively.

29. A driving circuit according to claim 22, further comprising a resistor with a specific resistance value, connected in series to said capacitor.

30. A driving circuit according to claim 29, further comprising a plurality of resistors, each with a specific resistance value, connected in series to said first light-emitting diode and said at least one further light-emitting diode, respectively.

31. A driving circuit according to claim 22, further comprising a plurality of resistors, each with a specific resistance value, connected in series to said first light-emitting diode and said at least one further light-emitting diode, respectively.

32. A driving circuit according to claim 21, further comprising a protection diode connected in a reverse direction and in parallel to said first light-emitting diode.

33. A driving circuit according to claim 32, further comprising a resistor with a specific resistance value, connected in series to said capacitor.

34. A driving circuit according to claim 33, further comprising a resistor with a specific resistance value, connected in series to said first light-emitting diode.

35. A driving circuit according to claim 22, further comprising a resistor with a specific resistance value, connected in series to said first light-emitting diode.

36. A driving circuit according to claim 21, further comprising a resistor with a specific resistance value, connected in series to said capacitor.

37. A driving circuit according to claim 36, further comprising a resistor with a specific resistance value, connected in series to said first light-emitting diode.

38. A driving circuit according to claim 21, further comprising a resistor with a specific resistance value, connected in series to said first light-emitting diode.

39. A driving circuit according to claim 21, where in said first light-emitting diode is a visible light type light-emitting diode.

40. A driving circuit according to claim 21, wherein said first light-emitting diode is an infrared type light-emitting diode.

* * * * *